United States Patent [19]
Smialowicz

[11] 3,815,417
[45] June 11, 1974

[54] COMPENSATED PRESSURE INSTRUMENT

[75] Inventor: Edward H. Smialowicz, Point Pleasant, N.J.

[73] Assignee: The Garrett Corporation, Los Angeles, Calif.

[22] Filed: Nov. 10, 1971

[21] Appl. No.: 197,327

[52] U.S. Cl. .................. 73/345, 73/389, 73/418
[51] Int. Cl. ............................................. G01k 1/00
[58] Field of Search ............. 73/345, 346, 347, 418, 73/393, 389; 340/229, 266

[56] References Cited
UNITED STATES PATENTS

| | | | |
|---|---|---|---|
| 2,365,962 | 1/1942 | Kahn | 73/345 |
| 2,372,087 | 3/1945 | Karssik | 73/345 |
| 2,927,309 | 3/1960 | Poitras | 340/229 |
| 3,187,572 | 6/1965 | Harland | 73/345 |
| 3,302,460 | 2/1967 | Hennecke et al. | 73/345 |
| 3,357,394 | 12/1967 | Ingham et al. | 73/418 |

Primary Examiner—Donald O. Woodiel
Attorney, Agent, or Firm—Orville R. Seidner; Albert J. Miller; Alan E. Kopecki

[57] ABSTRACT

A pressure indicating instrument has a temperature indicating needle swingably disposed adjacent its pressure indicating needle for providing temperature compensated pressure data at the immediate location. Make and break contacts on the needles may be connected in an electrical circuit to provide the data to remote locations.

3 Claims, 6 Drawing Figures

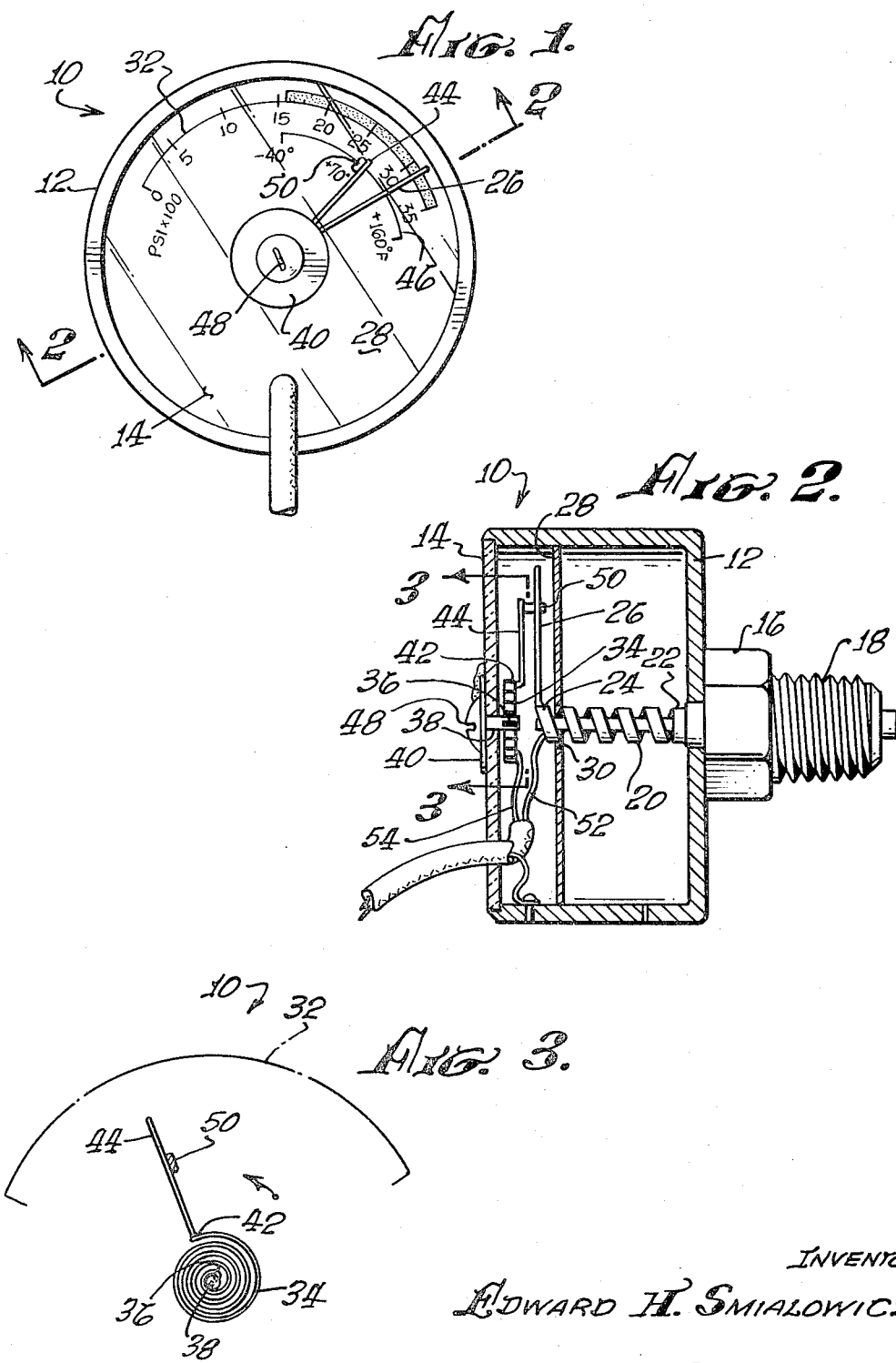

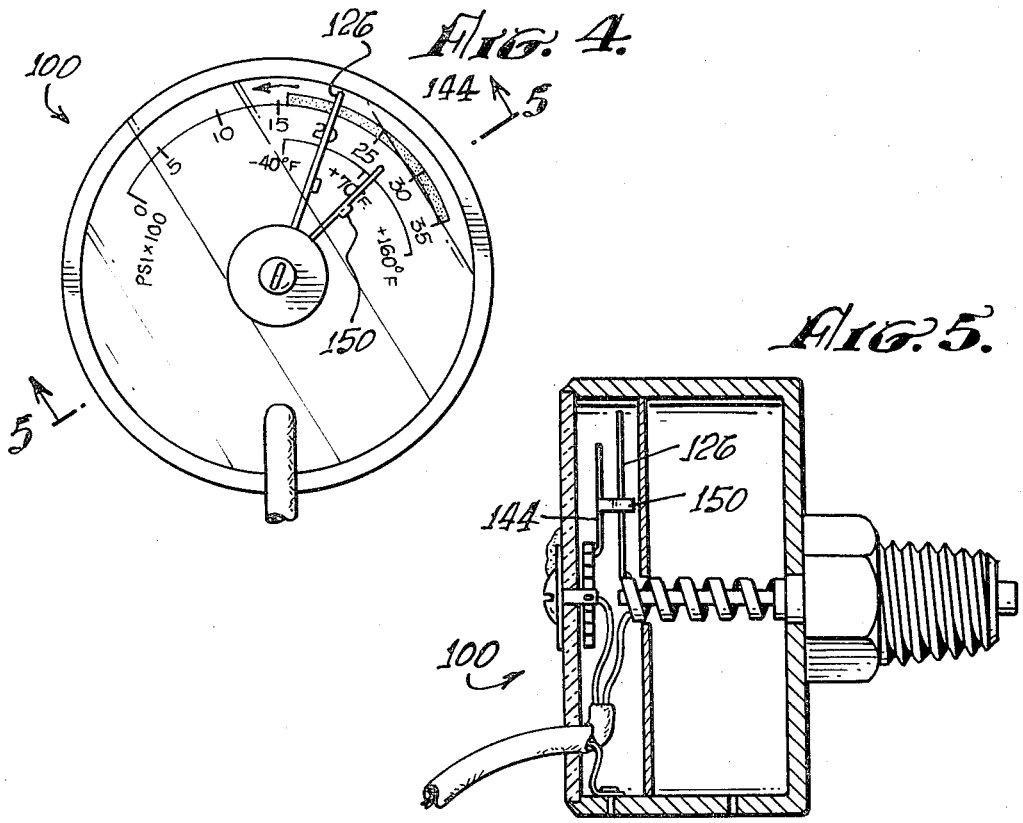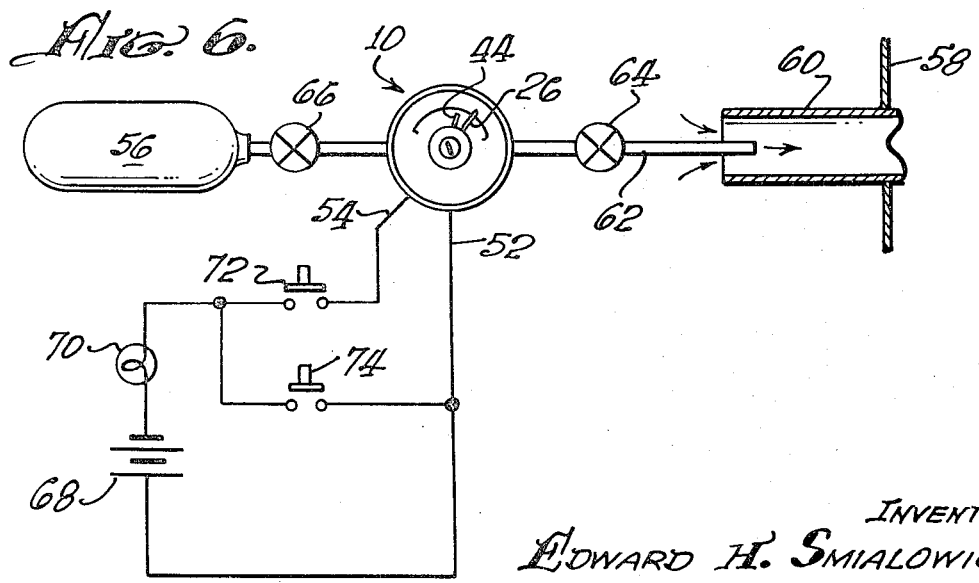

3,815,417

COMPENSATED PRESSURE INSTRUMENT

BACKGROUND OF THE INVENTION

Temperature compensation of standard Bourdon-type pressure gauges has been proposed in the prior art. Usually the proposed arrangement has comprised a temperature sensitive element as a part of the link mechanism interposed between the arcuately disposed pressure sensitive tube and its point of attachment to the gauge housing, or else in the link train between the pressure sensitive tube and the indicating pointer needle. These designs compensate for temperature-induced errors in the mechanical mechanism and introduce complexity and expensive manufacturing costs into a relatively simple instrument such as a pressure gauge, and may give rise to problems of sensitivity and hysteresis or non-repeatability effects.

The present invention overcomes these problems of the prior art by an almost complete dissociation of the temperature and pressure sensitive elements from physical dependence of one upon the other at the point of the critical temperature and pressure interrelationship of the fluid involved. Thus, in the case of a gaseous fluid, the instrument of the present invention automatically compensates with accuracy in accordance with the natural gas laws. Thus, with a novel, albeit fairly simple, arrangement the instrument is adapted to indicate leakage from a closed pressurized fluid system over a broad range of temperatures.

SUMMARY OF THE INVENTION

The instrument of the invention has first and second sensing elements, the first of which is adapted to sense pressure in a fluid pressure system and the second adapted to sense the temperature of the ambient fluid enveloping the system. The first element may be of the arcuate Bourdon-type, preferably comprising a helically coiled pressure tube of a plurality of coil turns. The second element may be of the bimetal type, preferably formed into a spiral coil.

Both sensing elements are provided with needle elements on their freely movable ends, the relative disposition of which may be used for a real time eyeball sight of the correlated fluid pressure and temperature states. Further, the needles may be provided with co-operative electrical contacts adapted to close or open an electrical indicating circuit upon contacting juxtaposition of the needle elements or contact-breaking divergence thereof.

BRIEF DESCRIPTION OF THE DRAWINGS

FIG. 1 is a front elevation view of one embodiment of the instrument;

FIG. 2 is a side elevation section taken on the line 2—2 of FIG. 1;

FIG. 3 is a fragmentary elevation view of the temperature sensing and indicating elements of the instrument, taken on the line 3—3 of FIG. 2;

FIG. 4 is a front elevation view of another embodiment of the instrument;

FIG. 5 is a side elevation section taken on the line 5—5 of FIG. 4; and

FIG. 6 is a schematic of one form of pressurized fluid system employing the invention.

DESCRIPTION OF THE PREFERRED EMBODIMENTS:

In FIGS. 1 and 2 there is illustrated an instrument 10 of generally conventional configuration and having an open-ended cup-shaped housing 12 provided with a transparent plastic or glass lens closure 14 over the open end thereof. The back side of the housing 12 has secured to it a threaded fitting 16 whose threaded end 18 is arranged for connection to a fluid pressure source (not shown). The fitting 16 communicates the fluid pressure to the interior of a helical pressure sensitive tube element 20 through one end 22 thereof, the other end 24 being closed and having secured to it the indicating needle 26 which is thereby adapted to swinging movement about the centerline of the helically wound tube 20. In back of the needle 26 and away from the inner face of the closure 14 is an indicia disc 28 secured to the housing 12 in a plane normal to the centerline of the tube 20. Thus the end 24 of the tube 20 extends through an opening 30 in the disc 28.

The disc 28 is provided with a pressure indication scale 32 providing an eyeball sight of fluid pressure in the tube 20 as indicated by the needle 26. As thus far described, the instrument 10 corresponds substantially to a conventional fluid pressure gauge wherein fluid pressure exerted on the interior wall of the tube 20 tends to cause an unwinding of the tube which is resisted by the spring characteristic thereof. Unwinding movement of the tube with increasing pressure causes clockwise movement (as viewed in FIG. 1) of the needle 26 as viewed against the indicia scale 32.

Additionally, the instrument 10 is provided with a temperature compensation feature as best seen in FIG. 3, comprising a thermally sensitive spiral element 34 which tends preferably to unwind with increasing temperature. The central end 36 of the spiral element 34 is secured to a small adjustment shaft 38 adjustably disposed for a slip fit within a fitting 40 secured in the closure lens 14. Preferably, the centerlines of the tube 20 and shaft 38 coincide with the general plane of the spiral element 34 normal to the centerline and displaced slightly from the parallel plane of movement of the pressure indicating needle 26 on the tube 20.

The outer end 42 of the spiral element 34 has secured to it an indicating needle 44 swingable in an arc in the plane of the spiral 34. As seen in FIG. 1 the disc 28 is also provided with a temperature indication scale 46 providing an eyeball sight of temperatures of the spiral 34 as indicated by the needle 44. For calibration of the spiral 34 for the temperature to which it is subjected, the outer end of the small shaft 38 is provided with a screwdriver slot 48. After the calibration is completed a drop of epoxy cement may be applied to outer end of the shaft 38 and to the fitting 40 to prevent inadvertent slippage of the shaft in the fitting, as will be apparent to those skilled in the art. As best seen in FIG. 2, the temperature indicating needle 44 is provided with a projecting arm element or contact 50 which may be engaged by the pressure indicating needle 26 under circumstances explained in detail below. As illustrated in FIG. 1, the needles 44 and 26 are separated with the temperature needle 44 indicating a temperature of about 72°F. and the pressure needle 26 indicating a system pressure of about 3,200 psi. It will be appreciated that these temperature and pressure scales and indications shown are merely exemplary of a particular situation involving the pressure condition of the fluid source coupled to the fitting 16 and the ambient temperature condition sensed by the spiral element 34.

An electrical conductor 52 is secured to the pressure sensitive tube 20 and another electrical conductor 54 is secured to the temperature sensitive spiral 34. Thus, the actual physical contact of the needle 26 with the projecting contact element 50 on the needle 44 serves to close an electrical circuit through the conductors 52 and 54 and thus excite an alarm or turn on a warning light in an electrical circuit which may be coupled to the conductors 52 and 54 in any preferred circuit configuration.

The invention has utility to provide a warning of fluid leakage from a storage system in an aircraft where the ambient temperature to which the system may be exposed may vary over an extremely wide range from about −65°F. to about +160°F. Storage systems of this type provide fluid storage of pressurized gas to be utilized with inflatable slides and rafts carried aboard aircraft for emergencies. It is apparent that undetected leakage from such a system is not to be tolerated, yet a conventional pressure gauge is not to be trusted because of indicated variations of pressure arising out of the mere workings of the gas laws.

In other words, the system may be charged initially at an intermediate temperature of say 70°F. to a nominal pressure of say 3,000 psi. According to the gas laws the pressure would drop considerably if the temperature of the stored gas dropped to about −40°F., but would rise proportionately if the temperature rose to about 130°F. Under these temperature variation circumstances it would be next to impossible to determine merely from a pressure gauge reading whether or not any gas leakage had taken place between the time of charging and the routine check time. This is so particularly if the routine check were made near the temperature extreme points.

Furthermore, if a serious leak developed after the charging there would be no means for warning the aircraft crew by means of an alarm or warning light. However, by employing the present invention, loss of fluid by leakage would be immediately made apparent by the ringing of the alarm or lighting of the lamp in the circuit when the needle 26 receded with loss of pressure without a concurrent receding of the needle 44, as the electrical contact is established by the needle 26 with the projection 50 on needle 44. This is illustrated schematically in FIG. 6 wherein a fluid storage source comprising a bottle of gas 56 is arranged to charge an inflatable device fragmentarily depicted at 58. The bottle 56 communicates with the jet pump device 60 through a conduit 62 within which is disposed the shutoff valves 64 and 66, between which is coupled the instrument 10 of the present invention.

The electrical conductors 52 and 54 of the instrument 10 are coupled in a series circuit including, for example, a battery 68, an indicating lamp 70, and a switch 72 which is normally closed when the circuit is to be energized for the stated purpose. A switch 74 may be provided for a momentary test of the portion of the circuit including the battery 68 and lamp 70, as will be apparent to those skilled in the art.

In use the switch 72 is normally closed, the valve 64 is normally closed and the valve 66 normally open so that the charge pressure in the bottle 56 is sensed and indicated by the instrument 10 and is collaterally energized lamp 70. If, for example, the charge pressure is as desired, the pressure indicating needle 26 will be advanced and separated from the temperature indicating needle 44, thus providing a visual indication of well-being of the system to observers of the instrument 10 by reason of the divergence of the needles 26 and 44, substantially as shown in FIG. 1. Also, since the circuit to the lamp 70 is open at the point of the spacing between the needle 26 and the contacting arm 50 on the needle 44, the unlit lamp is a remote indication of system well-being.

Upon loss of charge pressure, for example by leakage, the needles 26 and 44 converge. When the two needles are aligned the visual indication of system pressure loss is apparent at once to observers, and at the same time the needle 26 contacts the arm 50 on needle 44 to close the circuit to lamp 70 which then alerts the remote observer of distress in the storage system.

The embodiment of the invention depicted on FIGS. 4 and 5 provides an alternative manner of indicating the health of the pressure fluid system. The instrument 100 illustrated therein comprises respective pressure and temperature indicating needles 126 and 144, the latter being provided with a projecting contact 150 adapted to being engaged by the needle 126 and thereby close an electrical circuit as aforesaid in connection with the embodiment of FIGS. 1, 2 and 3. In the case of the embodiment of FIGS. 4 and 5, however, the arrangement of the needles and projecting contact is such that the contact is broken with decreasing pressure when leakage occurs. That is to say, the contact of needle 126 with the projection 150 on needle 144 is maintained with a pressure system state of well-being; whereby the glow of the signal lamp corresponding to the lamp 70 of FIG. 6 would continuously indicate a satisfactory fluid system state. Then at such time as leakage occurred to such extent as to cause the needle 126 to diverge from the needle 144 and thus break the electrical circuit, the indicating lamp would be extinguished.

It is now apparent that both the temperature and pressure indicating needles advance with increasing temperature and retreat with decreasing temperature, but that the pressure indicating needle will retreat or tend to retreat more than the temperature indicating needle when fluid leakage occurs in the system. In the case of FIGS. 1, 2 and 3 the pressure needle 26 retreats with fluid loss until it makes contact with the projection 50 on the temperature needle 44. Further retreat of needle 26 will result in needle 44 being forcibly moved with needle 26. In the case of FIGS. 4 and 5 the needle 126 is normally in contact with the projection 150 due to the normal tendency of the temperature needle 144 to retreat downscale. Upon the advent of fluid leakage, both needles retreat until the temperature needle reaches its ambient temperature indicating position. Any further leakage will result in additional retreat of the pressure needle causing it to diverge from contact with the projection 150 and thus breaking the circuit. The divergence of the needles is also evident at that time to instant observation.

I claim:
1. A pressure indicating instrument comprising:
a housing having a transparent wall portion;
a stationary temperature indication scale in said housing;

a first pointer member in said housing movable relative to said temperature indication scale;

a stationary pressure indication scale on said housing;

a second pointer member in said housing movable relative to said pressure indication scale;

said first and second pointer members being electrically conductive and being arranged for movement along paths of travel in spaced parallel planes, one of said pointer members having an electrically conductive projection intersecting the path of the other of said pointer members;

first mounting means for said first pointer member including a bimetal device arranged spirally about a central axis, said bimetal device being fixed at one end against movement relative to said housing, said first pointer member being attached to said bimetal device for swinging said first pointer member in its path of travel about said central axis upon expansion and contraction of said device in response to temperature changes;

second mounting means for said second pointer member including a Bourdon tube coiled helically about said central axis and having means for receiving fluid under pressure, said Bourdon tube being fixed at one end to said housing and fixed at the other end to said second pointer member for swinging said second pointer member in its path of travel about said central axis in response to changes in fluid pressure in said tube;

said first mounting means including an adjustment shaft extending through said transparent wall portion, said shaft being aligned with said central axis and having means on the exterior of said wall for selectively rotating said shaft about said central axis and thereby adjusting the position of said first pointer member relative to said temperature scale, and electric circuit means for conducting electric current independently between said pointer members and the exterior of said housing, whereby a source of electrical current and a signal means when connected with said circuit means produce a signal in response to a predetermined relative movement of said pointer members.

2. The instrument according to claim 15 wherein said pointer members are normally angularly offset from each other and said predetermined movement positions said projection in contact with said other of said pointer members.

3. The instrument according to claim 15 wherein said pointer members are normally in alignment and said predetermined movement positions said projection spaced from said other of said pointer members.

* * * * *

UNITED STATES PATENT OFFICE
CERTIFICATE OF CORRECTION

Patent No. 3,815,417            Dated June 11, 1974

Inventor(s) Edward H. Smialowicz

It is certified that error appears in the above-identified patent and that said Letters Patent are hereby corrected as shown below:

Claim 2, line 1, change "15" to --1--

Claim 3, line 1, change "15" to --1--

Signed and sealed this 1st day of October 1974.

(SEAL)
Attest:

McCOY M. GIBSON JR.
Attesting Officer

C. MARSHALL DANN
Commissioner of Patents